March 19, 1940.   J. J. O'NEILL   2,194,317
CLAMP
Filed July 12, 1937
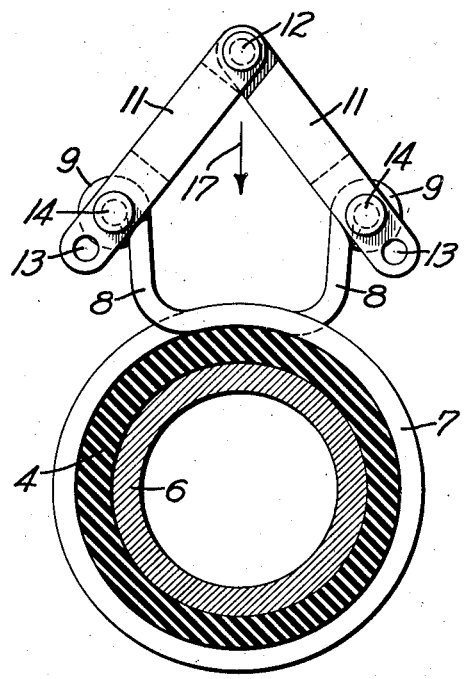
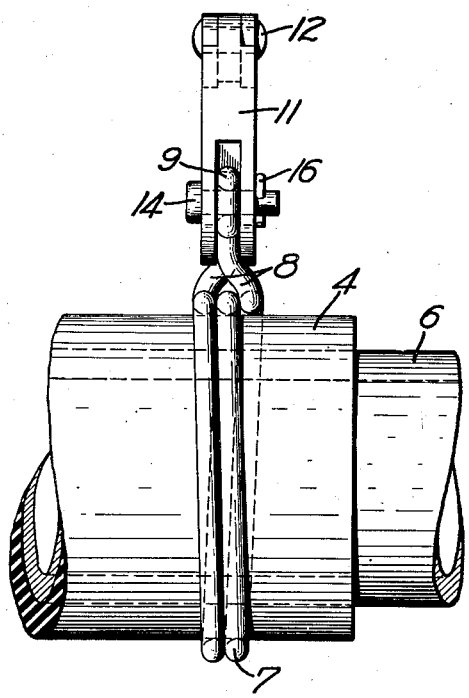
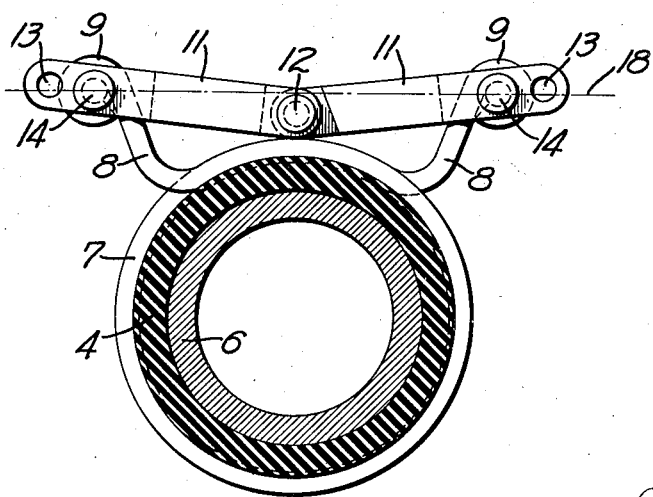
INVENTOR.
James J. O'Neill
BY
Harry C. Schroeder
ATTORNEY Patented Mar. 19, 1940

2,194,317

UNITED STATES PATENT OFFICE 2,194,317

CLAMP

James J. O'Neill, Oakland, Calif.

Application July 12, 1937, Serial No. 153,181

4 Claims. (Cl. 24—19)

This invention relates to devices for encircling deformable tubing to clamp the tubing on a member inserted therein so as to connect the parts together against ready separation.

It is an object of the invention to provide a clamp of the character described which may be instantly engaged or released.

Another object of the invention is to provide a clamp of the character described which is self-locking in its engaged position.

A further object of the invention is to provide a clamp which is readily adjustable to accommodate, within limits, tubing of different sizes.

Still another object of the invention is to provide a clamp which is characterized by ease and economy of manufacture which results in a low cost price to the consumer.

The invention possesses other objects and features of advantage, some of which, together with the foregoing, will be specifically set forth in the detailed description of the preferred form of the invention hereunto annexed. It is to be understood that the invention is not to be limited to the particular species thereof herein shown and described as various other embodiments thereof may be employed within the scope of the appended claims.

Referring to the drawing:

Figure 1 is a side elevational view of the clamp of my invention, in its released position, mounted on a pair of telescoped tubular members, the latter being shown in vertical section.

Figure 2 is a view similar to Figure 1 showing the clamp in its engaged position.

Figure 3 is a side elevational view of the clamp shown in Figure 1 and of the telescoped tubular members upon which the clamp is mounted.

Describing the invention in detail, my clamp may be used to engage the tubular member 4, which may be composed of rubber, lead or any other material which is compressible, with the preferably rigid tubular or cylindrical member 6, within the tube 4, and comprises a body formed of a plurality of helically wound turns of strap or rod 7 whose free ends are bent radially outwardly to form arms 8 each being provided at its distal end with a closed eye 9. The portions of the rod 7 forming the arms 8 are offset, as is shown in Figure 3, so that the eyes 9 will each lie in the same vertical plane intersecting the common axis of the tubular members 4 and 6.

An operating member is provided comprising a pair of links 11 pivotally joined together at one end by the pin or rivet 12 and each of which, at their other end, is provided with a pair of spaced apertures 13. A removable pivot pin 14, which is locked in place by a cotter pin 16, or by any other equivalent means, is provided for each link 11 and passes through one of the apertures 13 thereof and an eye 9 so as to pivotally connect the links with the eyes.

As will be seen in Figure 1, if pressure is applied, in the direction of the arrow 17, to the hinge of the operating member at the pivot pin 12, the arms 8 at the opposite ends of the clamp body will be forced apart thus causing diametrical compression of the body, as is shown in Figure 2, to contract the tube 4 about the periphery of the member 6. As the operating member is forced downwardly the leverage thereof on the receding arms becomes progressively greater, which compensates for and overcomes the increasing resistance to compression of the tube 4, until it reaches infinity when the links 11 are each longitudinally alined in the plane indicated by the dot and dash line 18. Continued movement of the operating member toward the common axis of the tubes 4 and 6 will cause the hinge of the member, at the pivot pin 12, to pass below the plane 18 until the links contact the clamp body whereupon the pressure exerted by the arms 8, which tends to return the latter toward each other to their normal free position shown in Figure 1, will forcibly maintain the links in contact with the clamp body until they are deliberately forced upwardly past the plane 18 when it is desired to release the clamp.

If the outer diameter of the tubing 4 is found to be such an amount smaller than the inner diameter of the clamp body that an insufficient pressure will be applied to the tube when the clamp is engaged or if the nature of the tube requires the exertion by the clamp of abnormal pressure, the pivot pins 14 may be withdrawn from the innermost apertures 13 at the end of each link 11 and inserted in the outermost apertures whereupon the arms 8 will be forced farther apart when the clamp is engaged with the result that a greater compression, diametrically, of the clamp body will be obtained.

From the foregoing description of my invention, it will be seen that I have provided a clamp for the purposes set forth which may be instantly engaged or released by the simple operation of moving the operating member upwardly or downwardly, which, due to the toggle action of the operating member, is capable of being engaged with the expenditure of very little physical exertion on the part of the user, which, due to the helical construction of the clamp body, is capable of exerting a uniform pressure circumferentially about the object being clamped, which is self-locking against ready disengagement in its engaged position, and which is capable, due to its few simple and easily manipulated parts, of being produced to sell for a very economical price.

I claim:

1. In a device of the class described, a helical clamping member adapted to be engaged with an object to be clamped and having resilient arms extending beyond the helix portion of said member along lines constituting extensions of chords of said helix portion, and a toggle linkage connecting said arms, comprising a knee pivot movable through dead center position to lock said device in clamping position.

2. In a device of the class described, a helical clamping member adapted to be engaged with an object to be clamped and having resilient arms extending beyond the helix portion of said member along lines constituting extensions of chords of said helix portion, and a toggle linkage connecting said arms, comprising a knee pivot movable to flex said arms and constrict said helix portion about an object to be clamped and thence through dead center position to lock said device in clamping position.

3. In a device of the class described, a helical clamping member adapted to be engaged with an object to be clamped and having resilient arms extending beyond the helix portion of said member along lines constituting extensions of chords of said helix portion, and operating mechanism disposed between said arms, operable to displace said arms in opposite directions to constrict the helix portion of said member, and effective upon further operation to permit limited resilient retrograde displacement of said arms; said mechanism serving to lock the device in clamping position upon such retrograde movement of said arms.

4. In a device of the class described, a helical clamping member adapted to be engaged with an object to be clamped and having portions extending beyond the helix portion thereof, a toggle linkage pivotally connected to said extending portions, comprising a pivotal knee connection movable through dead center position to lock said device in clamping position, and means for adjusting the diameter of the helix portion of said member comprising alternative pivotal connections for said toggle linkage.

JAMES J. O'NEILL.